United States Patent [19]
Riley

[11] Patent Number: 5,456,224
[45] Date of Patent: * Oct. 10, 1995

[54] VARIABLE VALVE LIFT MECHANISM FOR INTERNAL COMBUSTION ENGINE

[75] Inventor: Michael B. Riley, Fort Collins, Colo.

[73] Assignee: Motive Holdings Limited, Virgin Islands (Br.)

[ * ] Notice: The portion of the term of this patent subsequent to Nov. 22, 2011 has been disclaimed.

[21] Appl. No.: 246,274

[22] Filed: May 19, 1994

Related U.S. Application Data

[63] Continuation-in-part of Ser. No. 122,223, Sep. 15, 1993, Pat. No. 5,365,895, which is a continuation of Ser. No. 800,920, Dec. 3, 1991, Pat. No. 5,341,771.

[51] Int. Cl.⁶ ........................ F01L 1/34
[52] U.S. Cl. ............... 123/90.16; 123/90.41; 123/90.45
[58] Field of Search ............. 123/90.15, 90.16, 123/90.27, 90.39, 90.41, 90.44, 90.45

[56] References Cited

U.S. PATENT DOCUMENTS

| | | | |
|---|---|---|---|
| 4,721,007 | 1/1988 | Entzminger | 123/90.16 |
| 4,986,227 | 1/1991 | Dewey, III | 123/90.16 |
| 5,107,802 | 4/1992 | Yagi et al. | 123/90.15 |
| 5,111,781 | 5/1992 | Kaku et al. | 123/90.16 |
| 5,119,773 | 6/1992 | Schön et al. | 123/90.16 |
| 5,148,783 | 9/1992 | Shinkai et al. | 123/90.16 |
| 5,189,997 | 3/1993 | Schneider | 123/90.16 |
| 5,205,247 | 4/1993 | Hoffman | 123/90.16 |
| 5,365,895 | 11/1994 | Riley | 123/90.16 |

FOREIGN PATENT DOCUMENTS

| | | | |
|---|---|---|---|
| 836367 | 1/1939 | France | 123/90.16 |

*Primary Examiner*—Henry C. Yuen
*Assistant Examiner*—Weilun Lo
*Attorney, Agent, or Firm*—Beaton & Folsom

[57] ABSTRACT

Variable valve lift in an engine is achieved by varying the location of the pivot of the rocker arm or finger follower as stated in an earlier patent application. The path of contact between the rocker arm or finger follower and the pivot may be circular or non-circular. The relationship between adjustment clearance and pivot shaft position yields controlled variation of phase and duration. At full lift the clearance would be within usual limits, while at partial lift reduced contact velocities allow greater clearance without increasing idle noise, and thus opening of valves may be delayed, and closing advanced. Deactivation of valves can occur with reduced lift and a suitably increased adjustment clearance, while maintaining adequately low contact velocities. With individual control of valves, one or more cylinders may be deactivated, or by varying lift independently on multi-valve engines, mixing of incoming gases may be enhanced.

18 Claims, 19 Drawing Sheets

VARIABLE VALVE LIFT MECHANISM FOR INTERNAL COMBUSTION ENGINE

This application is a continuation-in-part of application Ser. No. 08/122,223 filed on Sep. 15, 1993, now U.S. Pat. No. 5,365,895 which is a continuation of Ser. No. 07/800,920 filed Dec. 3, 1991, now U.S. Pat. No. 5,341,771.

FIELD OF THE INVENTION

The present invention relates to an internal combustion engine using poppet type valves to direct gases into and out of one or more cylinders. The degree of lift of the valves, particularly the intake valve, may be altered, along with the opening and closing times of the valves, to optimize engine torque at different engine speeds.

BACKGROUND OF THE INVENTION

The flow dynamics of gases entering and exiting internal combustion engines is one of the controlling factors of engine performance. Most engines must work over a wide speed and load range, making it difficult to achieve optimum efficiency over more than a narrow part of that range. For simplicity, economy and durability, most conventional four stroke engines use the tried-and-true fixed camshaft systems that have constant phase (when the valves are opened), duration (how long the valves are held open) and lift (how far the valves are lifted off their seats). This leads to certain design compromises to achieve acceptable performance. An engine that produces high torque for its capacity at low engine speeds usually gives poor torque at higher engine speeds, and vice versa. In a paper given at the Society of Automotive Engineers Congress in Detroit (Hara, Kumagai and Matsumoto, 1989 SAE paper 890681), the authors present experimental results on an engine in which the timing and lift were varied. Torque was improved by 7% at 1600 rpm by variation of lift, and the improvement at 6000 rpm was 14%. Alteration of lift of the intake valve produced most of the effects seen.

Many approaches have been proposed and tried in attempts to optimize the flow processes. Improvements to the flow dynamics are achieved by three separate but interrelated processes: variable phase, variable duration, and variable lift. It is well known that engines that produce high torque at low speeds have lower overlap between the closing of the exhaust valve and the opening of the intake valve. Small overlap allows for little communication between the exhaust gases and the incoming fresh charge, limiting the amount of uncontrolled mixing. This leads to stable operation. However, at high speeds the inertia of the gases requires a greater period of overlap to allow for gas exchange. The simplest way of achieving the change in overlap is to alter the relative timing, or phasing, of the intake camshaft to the crankshaft and exhaust camshaft.

If the phase of a valve event is altered, say advancing the valve opening to an earlier crankshaft angle, then the closure of that valve is also advanced. In many cases, this causes a reduction of the amount of combustible gas that can enter the engine. To overcome this situation, the duration of the valve event may be altered. In the example above, as the engine speed is increased and the valve overlap is increased (opening the intake valve earlier), the period that the intake valve stays open is extended to delay the closing.

The peak lift of valves is designed to accommodate gas flow at maximum engine speeds without significant pressure drops. This is more important for the intake process than the exhaust process, where the piston pushes the gases out. At engine speeds below maximum, the velocity of incoming gases through the valve curtain will produce less turbulence, and may lead to lower torque than would be achieved with a smaller valve opening. By varying valve lift with engine speed, torque may be enhanced over the entire operating range of the engine. Additionally, reduced valve lifts at lower speeds may reduce the frictional losses of the valve train, depending on the design.

There are many examples in the U.S. patent literature of methods of varying either or all of phase, duration and lift. Many authors have recognized that engine performance over a wide speed range may be improved by providing a means of switching between two independent cam profiles for low and high speed operation. Such an "on or off" type controller will provide different values of phase, duration and lift between the two (or possibly more) different engine speed ranges, resulting in improved performance and efficiency for each speed range. However, within each speed range, there is no means of varying phase, duration and/or lift. Examples of such mechanisms are given in U.S. Pat. Nos. 2,934,0452 by Longenecker, 4,151,817 by Mueller, 4,205,634 by Tourtelot, 4,970,997 by Inoue, et al. and 5,113,813 by Rosa. In SAE paper 890675 (Inoue, Nagahiro, Ajiki and Kishi, 1989) the authors point out that the variable valving system described in U.S. Pat. No. 4,970,997 would have greater mass than conventional systems. Extensive redesign of each component was undertaken to reduce this mass.

Another means of achieving variation in all three parameters is to use an axially moveable camshaft, with a variable profile in the axial direction. In this case there may be a smooth transition between different values of phase, duration and lift, although the relationship between all three is again fixed for a particular axial position of the camshaft. U.S. Pat. Nos. 3,618,574 by Miller and 5,080,055 by Komatsu, et al., describe such devices.

An alternative approach to varying all three parameters involves the use of multi-part rocker arms, with one or more of the arms pivoted eccentrically. In U.S. Pat. No. 4,297,270 by Aoyama two interacting rocker arms function to vary phase, duration and lift. In U.S. Pat. No. 4,438,736 by Hara, et al., problems with adjustment clearance and noise in the aforementioned patent are considered to be unacceptable. In this patent, as well as U.S. Pat. No. 4,498,432 by Hara, et al., the problem of clearance and noise is addressed by using an extendible hydraulic cam follower. In all of these cases, the phase, duration and lift of the valves is somewhat inflexible. These systems will probably experience higher levels of friction than conventional systems.

In U.S. Pat. No. 4,714,057 by Wichart, the author discloses control over all three parameters by using a multi-part rocker arm, and a control cam as well as the lift cam. A major purpose of their invention is to be able to control engine load without a throttle plate. Friction may be a problem with this design.

An innovative scheme is disclosed in U.S. Pat. No. 4,898,130 by Parsons, to vary the phase, duration and lift of the valves, with an eccentrically mounted oscillating drive. Besides giving good control over all three parameters, the mechanism disposes of the main valve spring, aiding in lowering friction. The technology is radically different from that employed in current engines, however, and requires the use of a rather long pushrod.

There are several different means disclosed for varying the lift only of valves. In U.S. Pat. No. 5,119,773 by Schon, et al., there is interposed either a slidable or pivoted member between the camshaft and the valve, with a moveable pivot providing control for its movement. The mechanisms described appear to have higher friction loads than conventional valve gear, as well as high lateral forces and increased reciprocating mass.

In U.S. Pat. Nos. 4,187,180 by Buehner and 4,519,345 by Walter, valve lift only is varied by moving the point of application of the lifting member to the rocker arm. In each case, the mechanism is applied to a pushrod engine, and appears unsuitable for an overhead camshaft geometry. The design does retain conventional valve clearance adjustment.

Movement of the rocker arm pivot is favored in U.S. Pat. No. 4,986,227 by Dewey. In this approach, the rocker arm has an arcuate upper surface upon which rides a moveable bearing held by a lever arm, with the lower end of said lever arm being pivoted in the head. Lateral location of the rocker arm is required to ensure the arm remains in contact with both the camshaft and the valve top. This is achieved by a special cap atop the valve, and a suitable recess in the end of the rocker arm. Adjustment of valve clearance differs from conventional valve trains. A similar rocker arm retention scheme is used by Schneider in U.S. Pat. No. 5,189,997, for an overhead cam engine with a finger follower arrangement.

Variable valve lift is achieved by yet another means in U.S. Pat. No. 5,031,584 by Frost. Two fixed pivot rocker arms are combined with a moveable interposed member to alter the mechanical advantage of the camshaft to valve movement. The design appears complex and subject to higher friction losses than conventional designs.

Another means of achieving variable valve lift by moving the pivot point is given by Hoffman in U.S. Pat. No. 5,205,247. A rotatable pivot shaft locates a pivot point for a circular rocker arm. The centers of the circular arms of the rocker arm are located on the same side of the rocker arm as the pivot. As the pivot point is varied, the circular shape of the rocker arm offers the same geometry to the cam and valve at each location of the pivot. Valve timing is altered by using different radii and/or offset centers for the arc segments either side of the pivot point, combined with cam profiles that differ from standard profiles.

Entzminger offers a simple concept for varying valve lift in U.S. Pat. No. 4,721,007. A toothed pivot shaft mates with a toothed rack embedded in an elongate rectangular slot in the rocker arm. The pivot shaft translates and rotates simultaneously, following a linear path defined by another stationary toothed rack. This approach has the advantage that the cam end and valve end of the rocker arm resemble a conventional rocker arm. The potential disadvantages of this design are the size of the pivot shaft and the rocker arm, and the flexibility of the rocker arm.

Another class of actuation mechanisms that can vary lift and duration is that of hydraulic actuation, with lost motion. In this method, the cam follower allows enclosed hydraulic fluid to leak out either through a fixed orifice, or through a controlled orifice. For the passive mechanism, the result is that the valve will not open as far or as long at low engine speeds, while at high speeds the leakage is insufficient to significantly alter the valve movement from a conventional system. The active control approach allows lift and duration to be controlled more closely. The result is that conventional throttling may be discarded, as valve motion may be enough alone to control the intake charge. Such a system is described in SAE paper 930820 (Urata, et al., 1993). The drawbacks to the system include non-recovery of the work of opening the valve, variations in motion as the oil changes viscosity with temperature, and complexity. An engine equipped with this system showed significant improvement in torque at lower engine speeds, and when installed in a vehicle, exhibited a fuel economy gain of 7%.

SUMMARY OF THE INVENTION

The present invention extends the system for dynamically altering the timing and lift of a poppet valve in an internal combustion engine, described in the earlier application. Variation of timing may be achieved with a rocker arm or finger follower shape that complements that of a path for a moveable pivot to create the desired valve clearance. The invention accomplishes variable lift, timing and duration with a moveable pivot for either the rocker arm or the finger follower while meeting other important operating requirements, including:

(1) The design is applicable to pushrod activated, single overhead cam (SOHC) activated and double overhead cam (DOHC) activated valves with either a rocker arm or finger follower.

(2) The design is applicable to a single intake and/or exhaust valve per cylinder, or multiple intake and/or exhaust valves per cylinder.

(3) The rocker arm or finger follower allows for adjustment of valve clearance in the same manner as a conventional rocker arm or finger follower.

(4) The rocker arm or finger follower is located by the pivot mechanism so that neither the cam end nor the valve end differs from conventional design.

(5) Valve clearance is within accepted limits at full lift, and can be increased or decreased as lift is reduced, if desired. As valve clearance is varied with lift, valve opening and closing will be affected oppositely. That is, if valve opening is delayed at lower lift, its closing will be advanced, reducing the duration of the event.

(6) The movement of the pivot point towards the valve can be far enough that the valve may be deactivated by increasing the valve clearance sufficiently.

(7) The mechanism may be applied to individual valves or to banks of valves. In the case of multiple intake valves per cylinder, independent operation may allow enhanced air flow characteristics.

(8) The mechanism has a minimum of moving parts, and is compact, requiring no increase in engine height, and allows considerable flexibility in layout of camshaft(s) and valves.

(9) The alteration of lift and/or phase and duration of valve events is accomplished during normal operation of the engine.

(10) Reduced lift leads to reduced friction, and that may justify eliminating the need for roller followers.

(11) Lower contact velocities at idle translate to lower noise levels, and that may justify eliminating the use of hydraulic tappets.

(12) The invention is suitable for use in designs wherein the rotation rate of the camshaft is alterable, or an axially varying camshaft is used.

(13) The invention is suitable for use in other designs where the phase and duration of the valve events are alterable by different means.

The degree of valve lift in an engine is controlled by varying the location of the pivot for the rocker arm or finger follower. For a rocker arm pivoted between the camshaft and the valve, or a pushrod and the valve, the upper portion of the central part of the rocker arm contains a rack of teeth that mate with the teeth of a cog fixed on the pivot shaft. The rocker arm rack may have a circular cylindrical shape, or may have a non-circular shape. The pivot shaft does not rotate for a given pivot position, but rolls across a stationary rack to change the effective rocker arm ratio of cam lift to valve lift, as Entzminger has described. The pivot shaft is constrained by two or more bearing guides of the same shape as the stationary rack. The shape of the stationary rack corresponds to either (1) a circle whose radius is constant according to the contact point of the cam (or pushrod) with the rocker, and the contact point of the rocker with the valve, and any intermediate position of the contact point with the pivot shaft and the toothed rack, resulting in constant adjustment clearance (achieved in the same manner as conventional valve gear) and variable phase and duration of the valve events, or (2) the same circular path as (1), but with the center of the circle offset from that for the rocker arm toothed rack, to allow varying adjustment clearance as the pivot point is moved, (3) a circular path whose radius and/or center may vary from that of the rocker arm, if its path is circular, or (4) a non-circular path allowing for non-uniform adjustment clearance, with the aim of varying phase and duration differently from above. Further, as the teeth on the rocker arm roll over the teeth on the pivot shaft rather than slide, frictional losses are very low.

For a finger follower operating a valve where both the cam and valve are on the same side of the pivot, the primary concept of the design is similar to that given above. The pivot end of the finger follower consists of a toothed rack which engages the complementary teeth of a cog fixed on the pivot shaft. As above, the pivot point changes by the pivot shaft rolling to a new position on the stationary rack by a path defined by two or more suitable bearing guides. The shape of the stationary rack and pivot shaft bearing guide are similar to those described above, depending on the geometry of the valve, cam and pivot. As indicated above, movement of the pivot shaft may or may not alter the valve clearance adjustment.

For those situations where valve clearance is increased with reduced lift, the contact velocity between the valve and actuator must be kept below that for the full lift case.

DETAILED DESCRIPTION OF THE INVENTION

Figure 1:
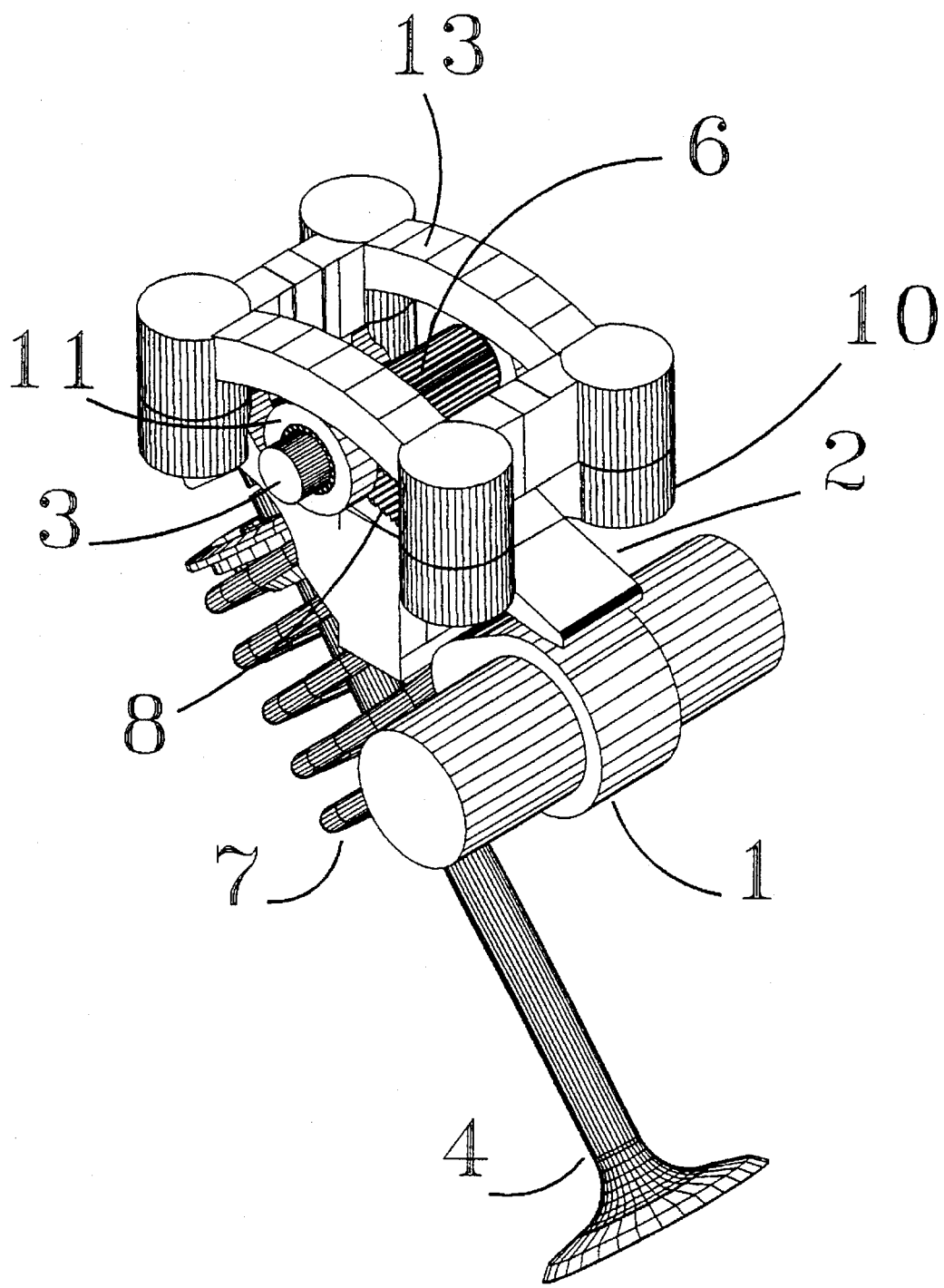
FIG. 1 is a perspective view of an embodiment of the rocker arm mechanism with the invention as applied to an overhead camshaft engine. The toothed rack atop the rocker arm is visible, with the toothed pivot shaft, one side of the stationary rack, the cam, the valve adjuster, the valve stem, and the guide block.
Figure 2A:
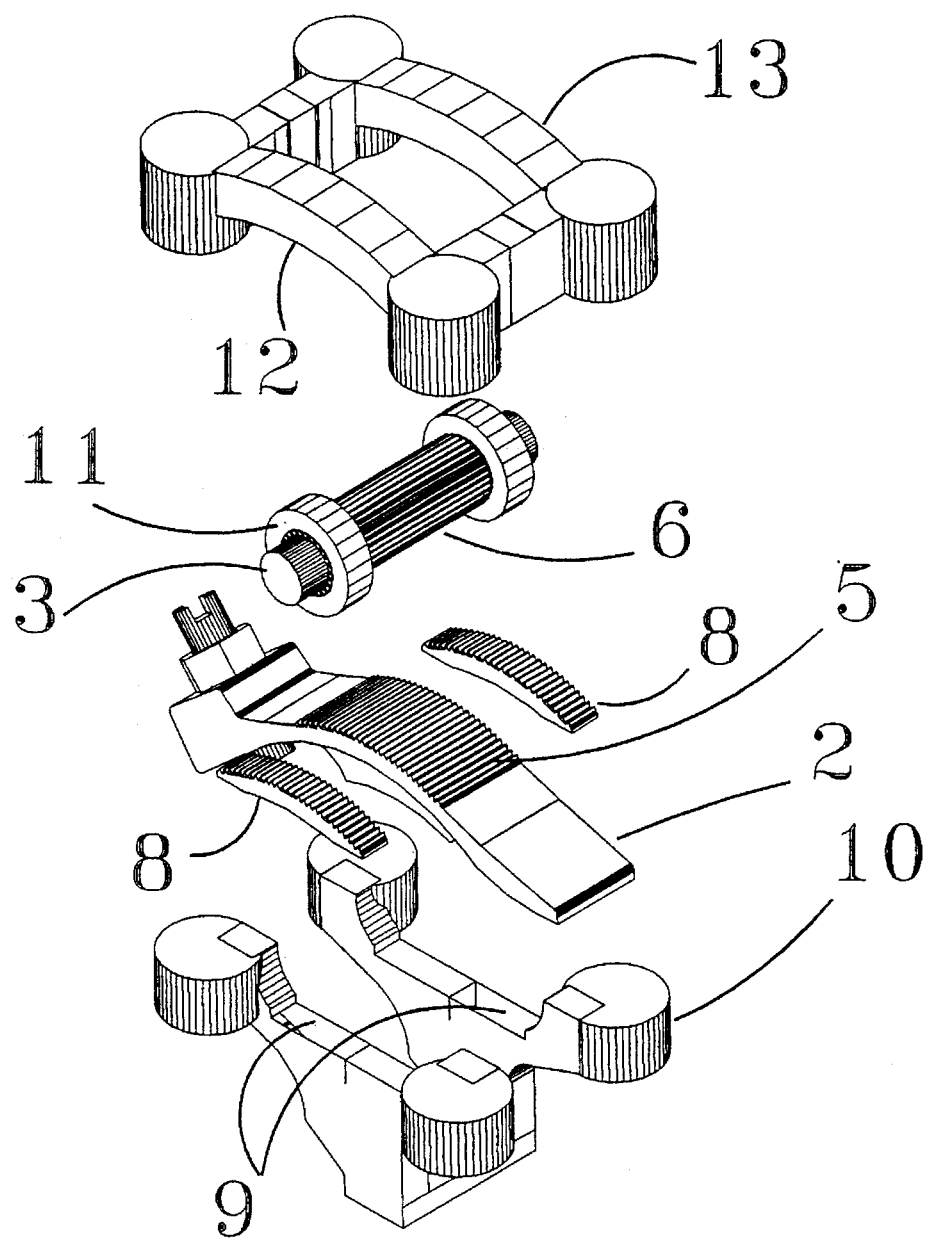
FIG. 2(a) shows an exploded view of the mechanism in FIG. 1
Figure 2B:
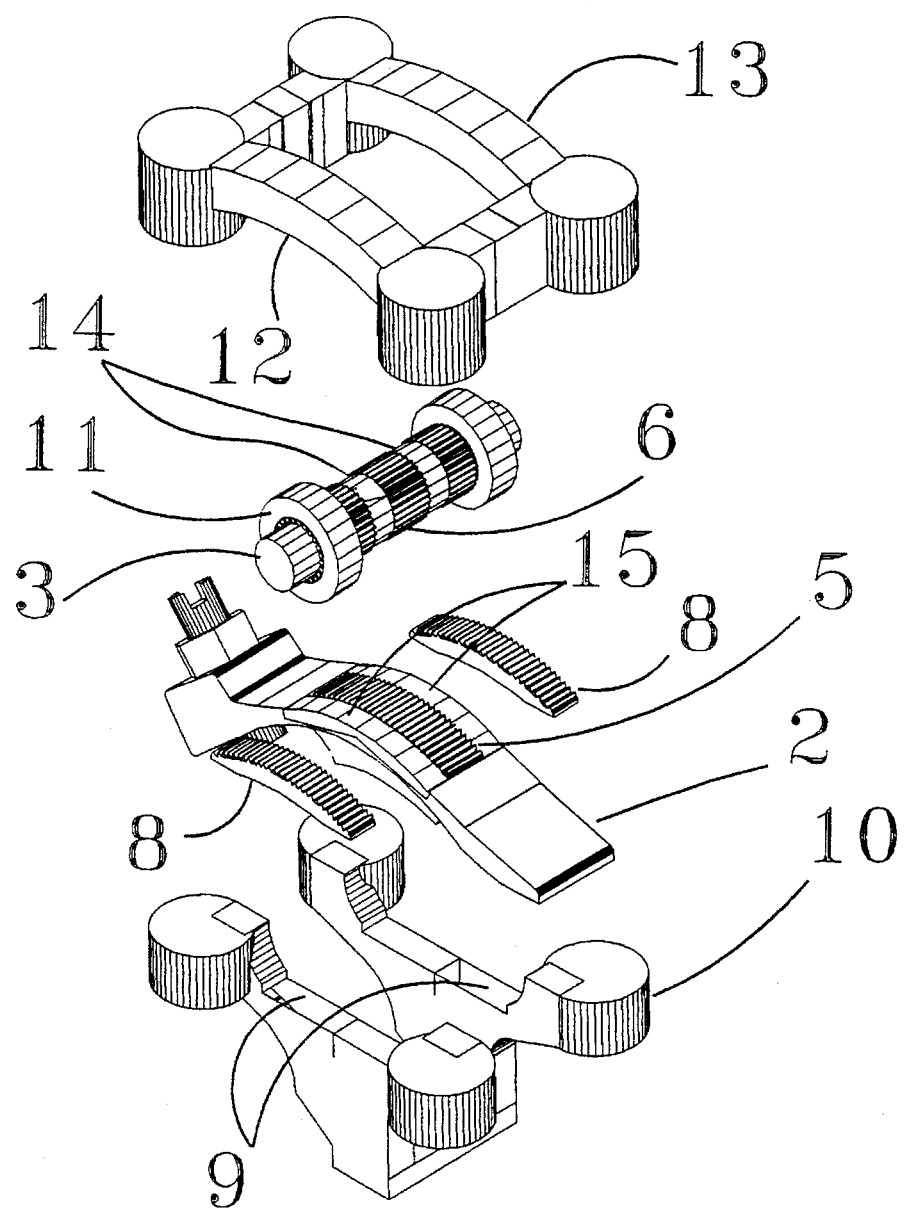
FIG. 2(b) shows another exploded view, with different shapes for the rocker arm and pivot shaft.

One embodiment of the mechanism is shown in FIGS. 1 and 2. FIG. 1 shows the mechanism assembled, and FIGS. 2(a) and 2(b) show two variations thereof in exploded format. Reference to either or all of FIGS. 1, 2(a) and 2(b) may be helpful in understanding the mechanism. In FIG. 1, cam 1 rocks rocker arm 2 against pivot shaft 3 to open valve 4. When cam 1 has its base circle presented to rocker arm 2, toothed rack 5 (see FIG. 2(a)) on the upper surface of said rocker arm is held in mesh with the teeth of toothed pivot cog 6 on pivot shaft 3 by a light spring (not shown). When cam 1 lifts its end of rocker arm 2 to rock the rocker arm 2, the resistive force of the valve spring 7 associated with valve 4 ensures contact between the toothed rack 5 and the toothed pivot cog 6. Stationary rack 8 has the same tooth pitch as toothed rack 5 on the upper surface of rocker arm 2, but not necessarily the same shape. When pivot shaft 3 is located at any one particular position, it is prevented from rotating by stationary rack 8. Stationary rack 8 floats in machined groove 9 (see FIG. 2(a)) in lower support 10, although the stationary rack has limits on its movement. It is urged upwards by one or more springs (not shown) and/or hydraulic pressure, and its upward movement is restricted by a lip at each end (not shown). Prior to reaching the upper limits of its travel, stationary rack 8 urges pivot shaft 3 upwards so that bearings 11 on pivot shaft 3 are pushed against bearing surfaces 12 (see FIG. 2(a)) on bearing guide 13. The shape of bearing surfaces 12, the pivot shaft 3 and the upper part of the rocker arm 2 determine the valve clearance as the pivot point is moved. No actuation mechanism is shown for moving pivot shaft 3 along stationary rack 8.

FIG. 2(a) shows an exploded view of the pivot mechanism with the rocker arm 2 and pivot shaft 3 relying on the teeth to provide resistance to rotation and the correct shape to provide an accurate path of movement. Provided stationary rack 8 has sufficient vertical movement, but very limited horizontal movement, the shape of its rack of teeth need not correspond exactly with that of the rocker arm. Upward urging of the stationary rack 8 by springs (not shown) and/or hydraulic pressure ensures constant contact between the stationary rack 8, the pivot shaft 3 and the bearing surfaces 12.

FIG. 2(*b*) shows a variation in the mechanism of the contact between pivot shaft 3 and rocker arm 2. Circular cylindrical surfaces 14 on pivot shaft 3 mate with appropriately machined surfaces 15 on rocker arm 2, while still allowing enough tooth engagement between pivot shaft 3 and rocker arm 2 to prevent significant movement of the pivot during actuation of the valve. The depth of teeth on pivot shaft 3 and rocker arm 2, and the height of the mating surfaces must be such that there is little backlash with the teeth. A thermoplastic or other slightly compressible material may be used for the pivot shaft and/or rocker arm teeth, or a coating thereon, provided it were unaffected by operating temperatures.

Figure 3A:
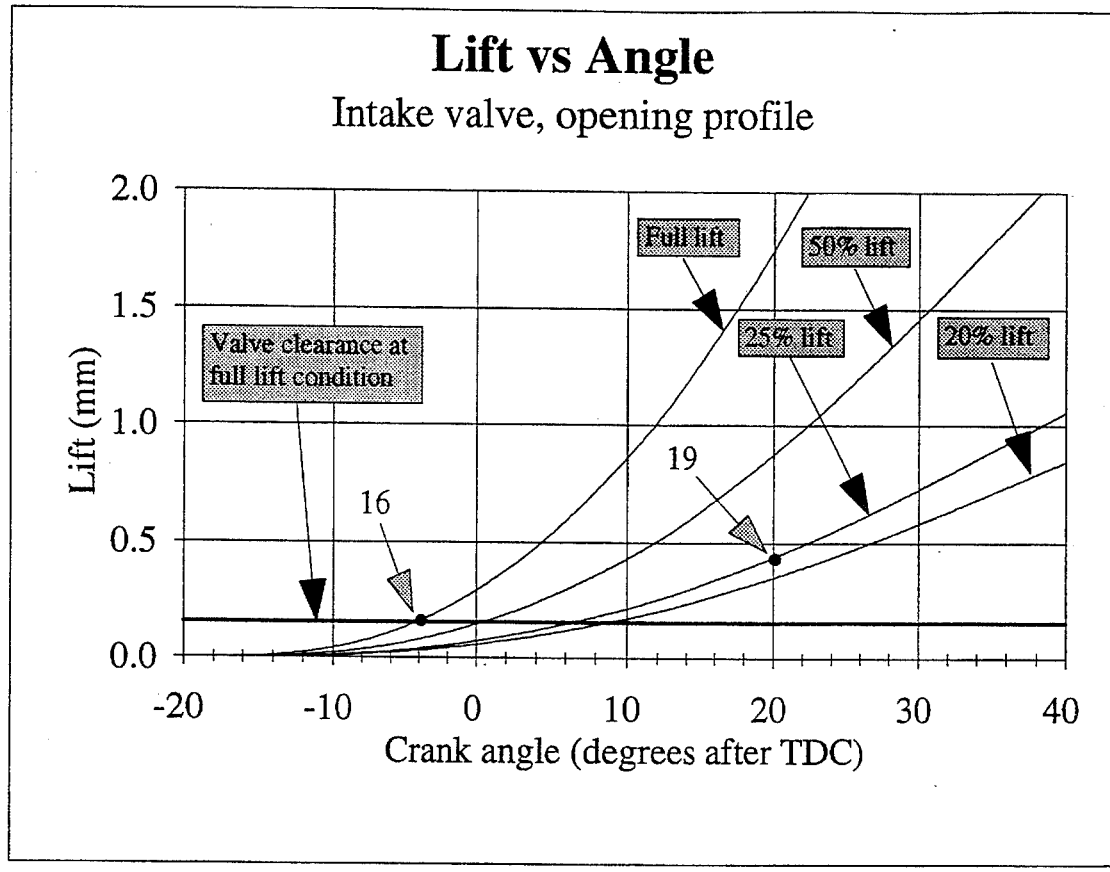
FIG. 3(a) shows a plot of valve lift profiles for a theoretical cam at full and partial lifts, for the opening of an intake valve.
Figure 3B:
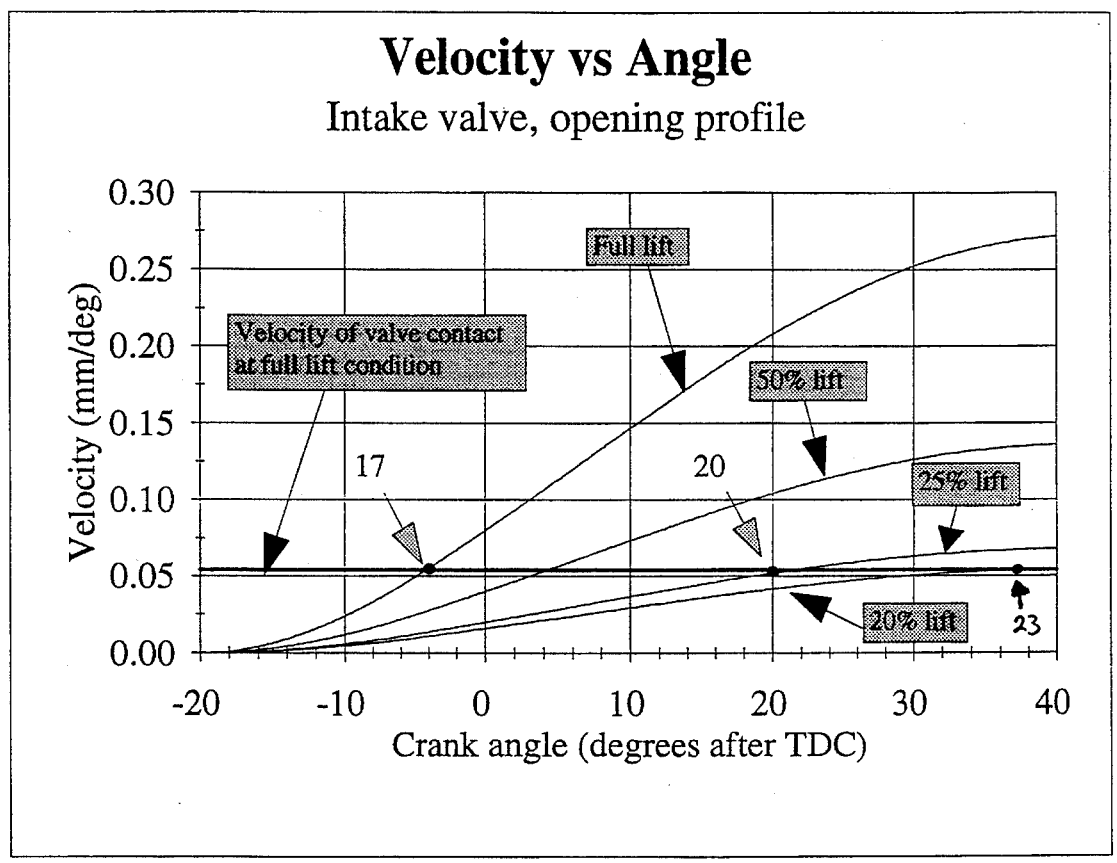
FIG. 3(b) shows a plot of valve velocity profiles for the lifts given in FIG. 3(a).

FIG. 3(*a*) shows a theoretical lift profile for an intake valve. This plot, plus FIGS. 3(*b*), 4(*a*) and 4(*b*) will be used to demonstrate how adjustment clearance may be varied with lift to provide valve opening and closing times that may be more suited to constant torque output over the engine speed range. Point 16 in FIG. 3(*a*) represents the crank angle of valve opening for a conventional mechanism operating at full lift. At 4.5° before top dead center (BTDC) the cam profile and rocker arm or finger follower have moved far enough to take up the clearance of 0.15 mm, or 0.006", between the valve actuator and the valve. Referring to FIG. 3(*b*), at 4.5° BTDC the velocity of contact between the valve and actuator is shown at point 17 as just over 0.05 mm/degree of camshaft rotation. (The units of velocity may also be converted to mm/second, but they are more convenient this way. At peak engine speed, which corresponds to full lift, the values of velocity, acceleration and jerk at a given angle are always greater than at lower speeds. This means that cam profiles have as their upper extreme of operation the full lift case used in many engines in production today. At lower values of lift it is relatively easy to ensure that values of velocity, acceleration and jerk always fall beneath those values at full lift.) For purposes of acceptable noise limits, this contact velocity should not be exceeded at different values of lift, particularly at or near idle conditions.

Figure 4A:
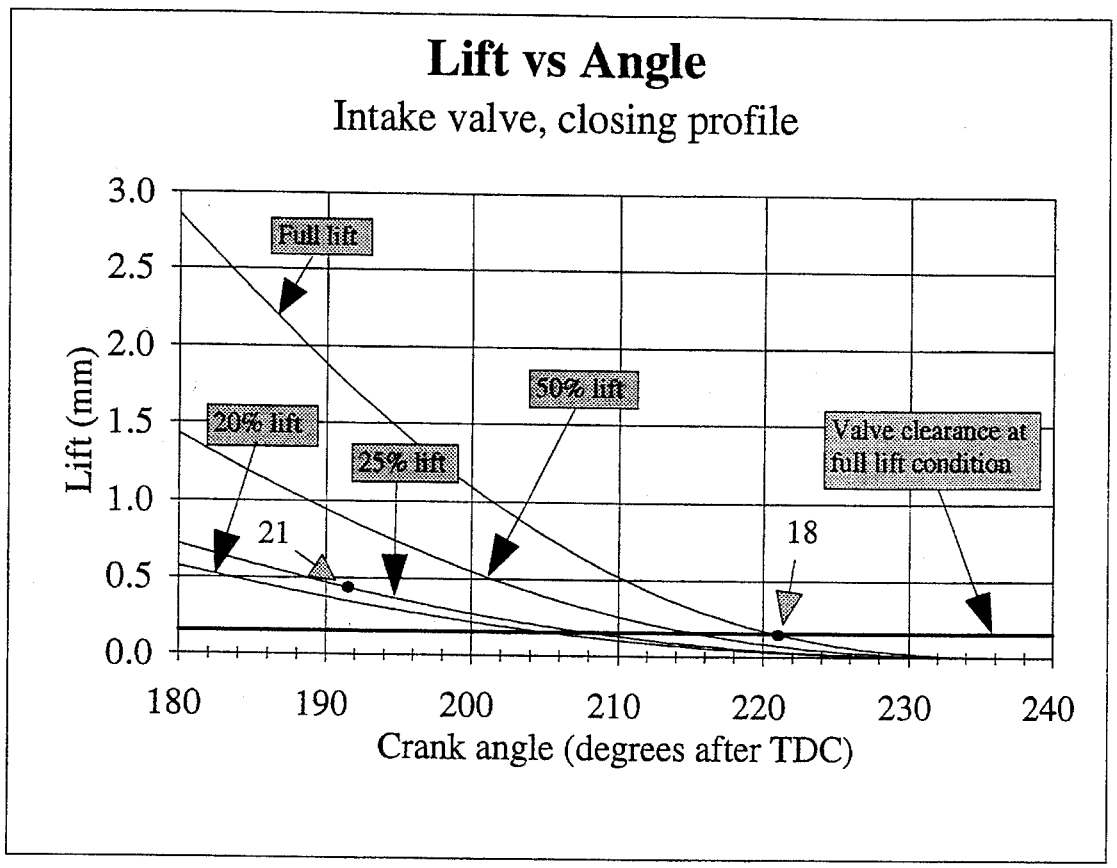
FIG. 4(a) shows a plot of valve lift profiles for a theoretical cam at full and partial lifts, for the closing of the same intake valve.
Figure 4B:
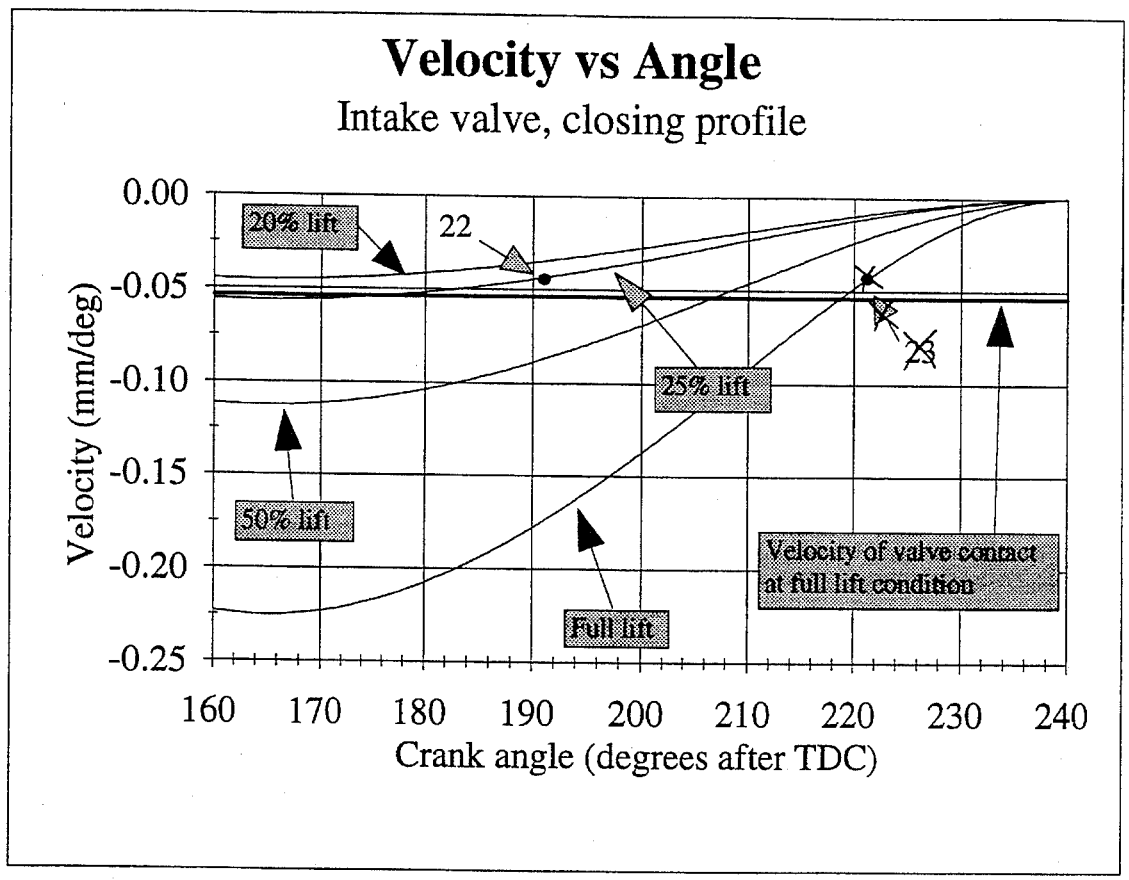
FIG. 4(b) shows a plot of valve velocity profiles for the lifts given in FIG. 4(a).

FIG. 4(*a*) shows the lift profile for the closing of the same valve, and it is slightly asymmetric compared to the opening. Point 18 in FIG. 4(*a*) corresponds to the angle at which the valve closes onto its seat, using the same clearance as in FIG. 3(*a*). This occurs at approximately 41° after bottom dead center (ABDC) in this example. At this same crank angle in FIG. 4(*b*), the contact velocity is approximately 80% of the opening velocity, due to the asymmetry of the opening and closing ramps.

Assuming the idle condition occurs at 25% of full lift, and intake opening is desired at 20° after top dead center (ATDC), the valve clearance required to achieve this is shown at point 19 in FIG. 3(*a*). The resulting clearance required is 0.44 mm, or 0.017", approximately three times greater than the full lift clearance. From point 20 in FIG. 3(*b*), the contact velocity is slightly less than that of the full lift case.

The selection of a particular opening angle at the idle condition will determine the closing angle for a given cam profile. In this case, the clearance at point 19 in FIG. 3(*a*) is the same as that used at point 21 in FIG. 4(*a*). This point corresponds to the intake valve closing at 11.5° ABDC.

Point 22 on FIG. 4(*b*) has a contact velocity around 80% that of the full lift case.

If less timing variation is required, there will be lower contact velocities which translate to lower tappet noise level, and may be a significant enough reason to eliminate the use of hydraulic tappets.

The variation shown in this example is 24.5° advance in opening the intake valve from idle to peak engine speed, and 29.5° delay in closing the intake valve. The adjustment clearance varied from 0.15 mm (0.006") to 0.44 mm (0.017"). These values may vary considerably depending on the cam profiles chosen, and the timing and lift variations sought.

The path between the maximum and minimum lift cases may be chosen however desired, as long as the values of velocity, acceleration and jerk do not exceed the limits mentioned above.

Valve deactivation occurs when the lift is reduced sufficiently that the greatest contact velocity of valve and actuator falls below the limit given by point 17 in FIG. 3(*b*). Point 23 in FIG. 3(*b*) shows that deactivation can occur in this case if the lift is reduced to 20% of full lift. To achieve this, the valve clearance must be increased from 0.44 mm at 20° ATDC, corresponding to 25% lift and maximum allowable contact velocity, to 0.89 mm at some angle after 20° ATDC but not too late in the cycle. This corresponds to 20% lift, and ensures that the contact velocities will always be below the limit defined by point 17 on FIG. 3(*b*). To deactivate the valve, the clearance must be increased to 20% of full valve lift to prevent the valve from being lifted from its seat. In this case, that corresponds to 1.8 mm clearance. The increase in valve clearance between 25% and 20% of lift, and then to deactivation must occur within a relatively small crankshaft angle. That means there must be only a small translation and rotation of the pivot point. This will require a non-circular path for the toothed pivot shaft/toothed rocker arm combination.

While no profiles have been shown for exhaust valves, it is evident that the same techniques apply, and the timing of exhaust valves may be varied as well. Exhaust valve lift variation in spark ignition, internal combustion engines may be limited to less than the intake valve, but in compression ignition engines it may be used to assist in exhaust braking.

Figure 5A:
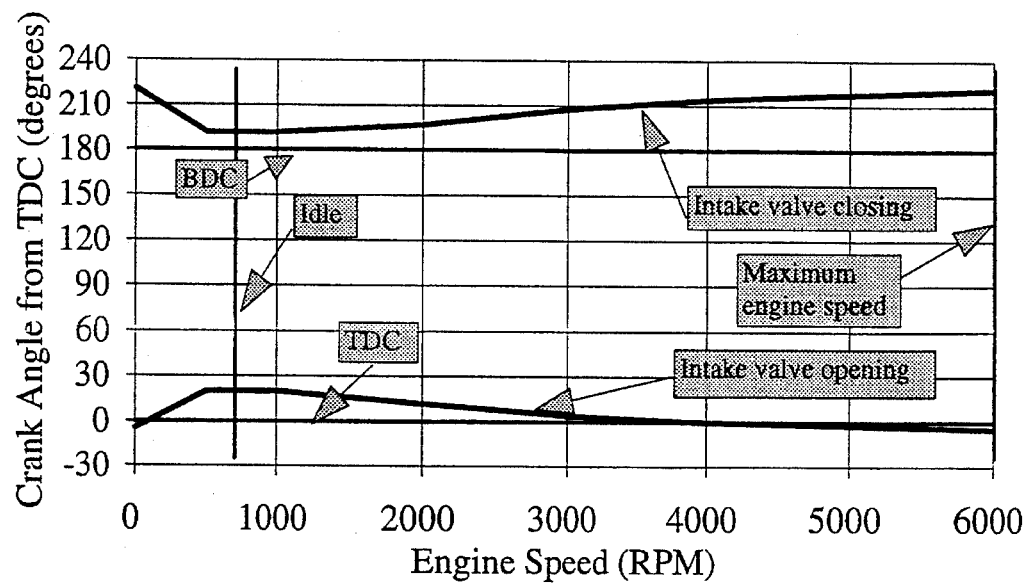
FIG. 5(a) shows one scenario for varying intake valve timing over the engine speed range with the present invention.
Figure 5B:
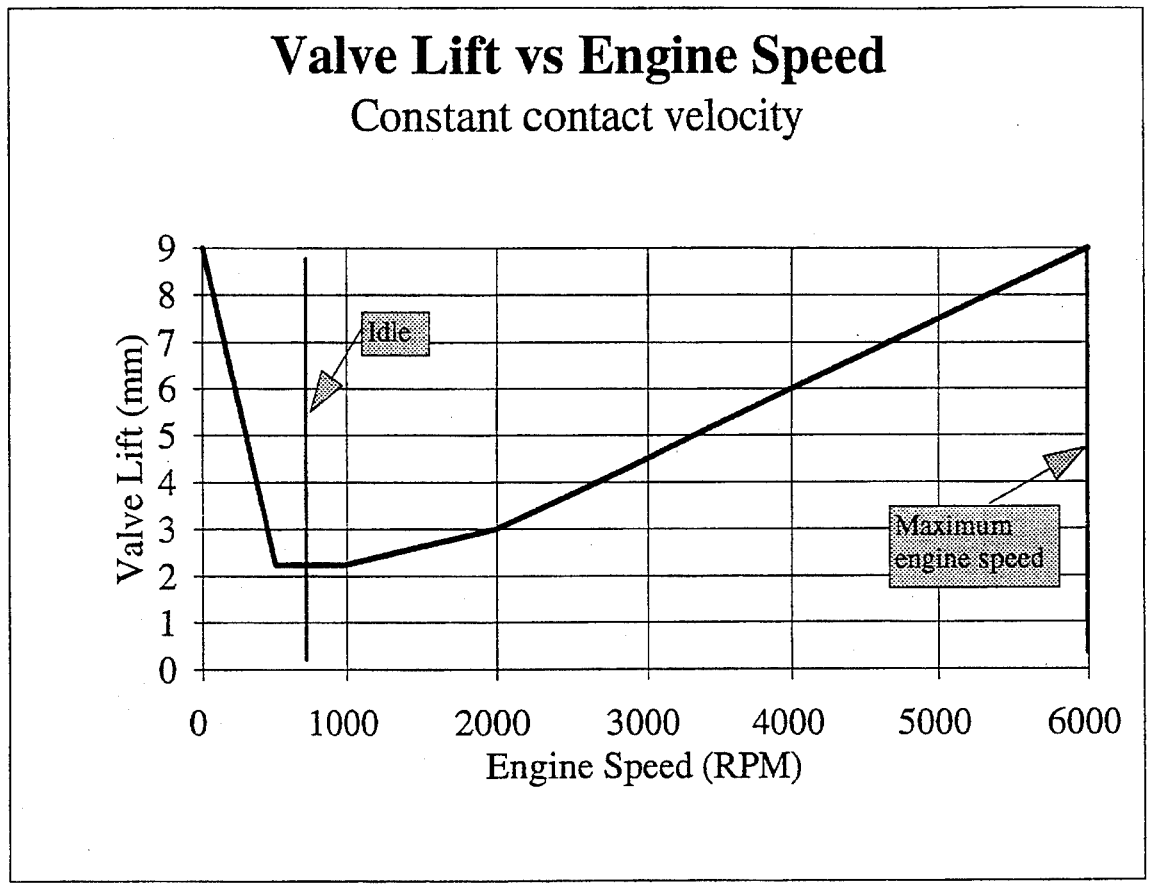
FIG. 5(b) shows the valve lifts for the timing schedule given in FIG. 5(a).
Figure 5C:
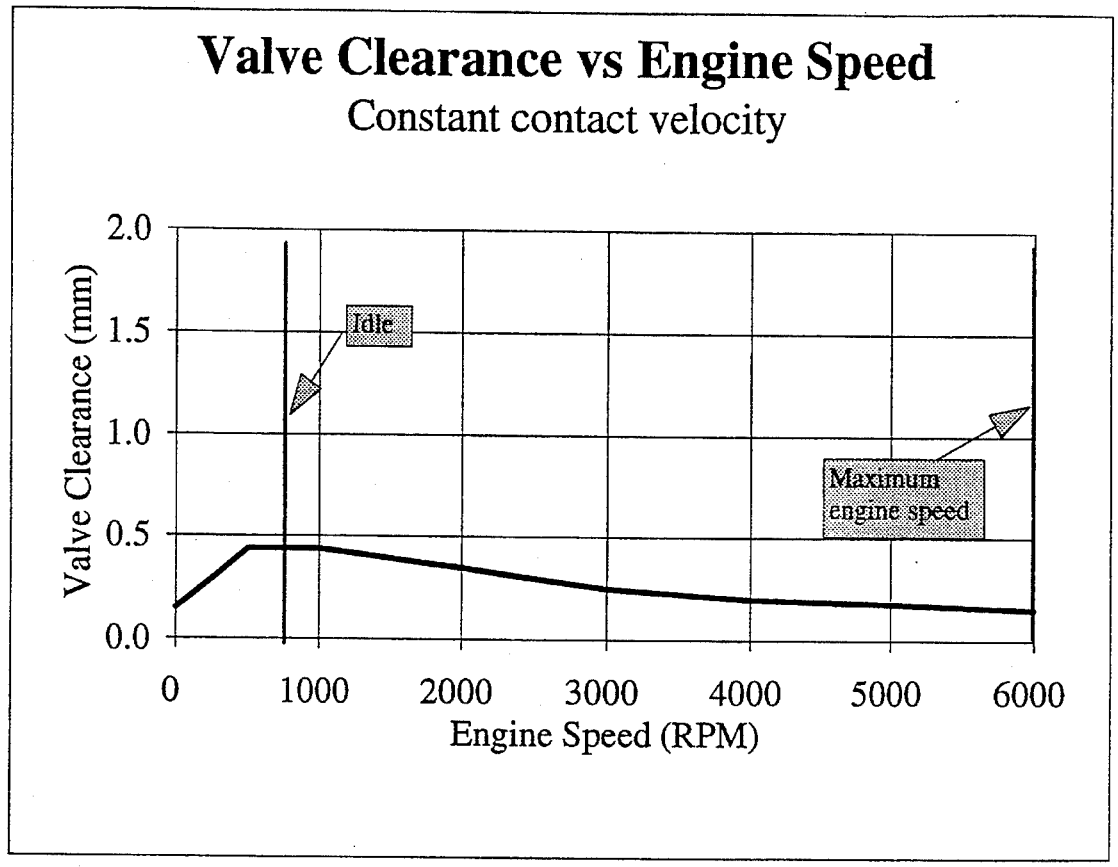
FIG. 5(c) shows the valve clearances for the timing schedule given in FIG. 5(a).

FIG. 5(*a*) shows a plot of how intake valve timing might be varied, to maintain constant contact velocities. At a given engine speed, the intake valve opening and closing angles may be determined from a vertical line intersecting the two curves. The angles are then read from the vertical axis. Valve timing at idle and peak engine speed are the same as the example given in FIGS. 3 and 4. FIG. 5(*b*) demonstrates the valve lift obtained over the same range of engine speeds for the timing given in FIG. 5(*a*). In this case the lift from 2000 RPM to 6000 RPM (the peak engine speed in this example) is varied linearly. If the volume flow rate of gas past the intake valve varies almost linearly with engine speed, then the bulk velocity of intake gases will be maintained at an essentially constant velocity over the speed range. In reality the velocity distribution past the intake valve curtain may vary significantly from this simple model, and a different lift profile may be appropriate. Masking of the valve may also be used to develop swirl of incoming gases to enhance mixing.

FIG. 5(*c*) shows how the valve clearance is varied over the engine speed range for the timing given in FIG. 5(*a*).

Figure 6A:
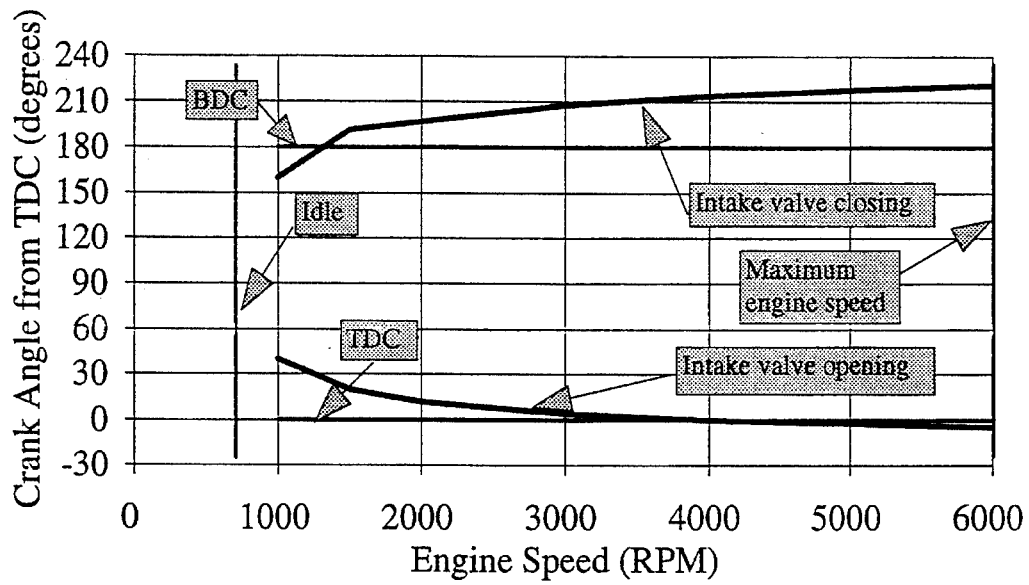
FIG. 6(a) shows another scenario for varying intake valve timing over the engine speed range, incorporating valve deactivation with the present invention.
Figure 6B:
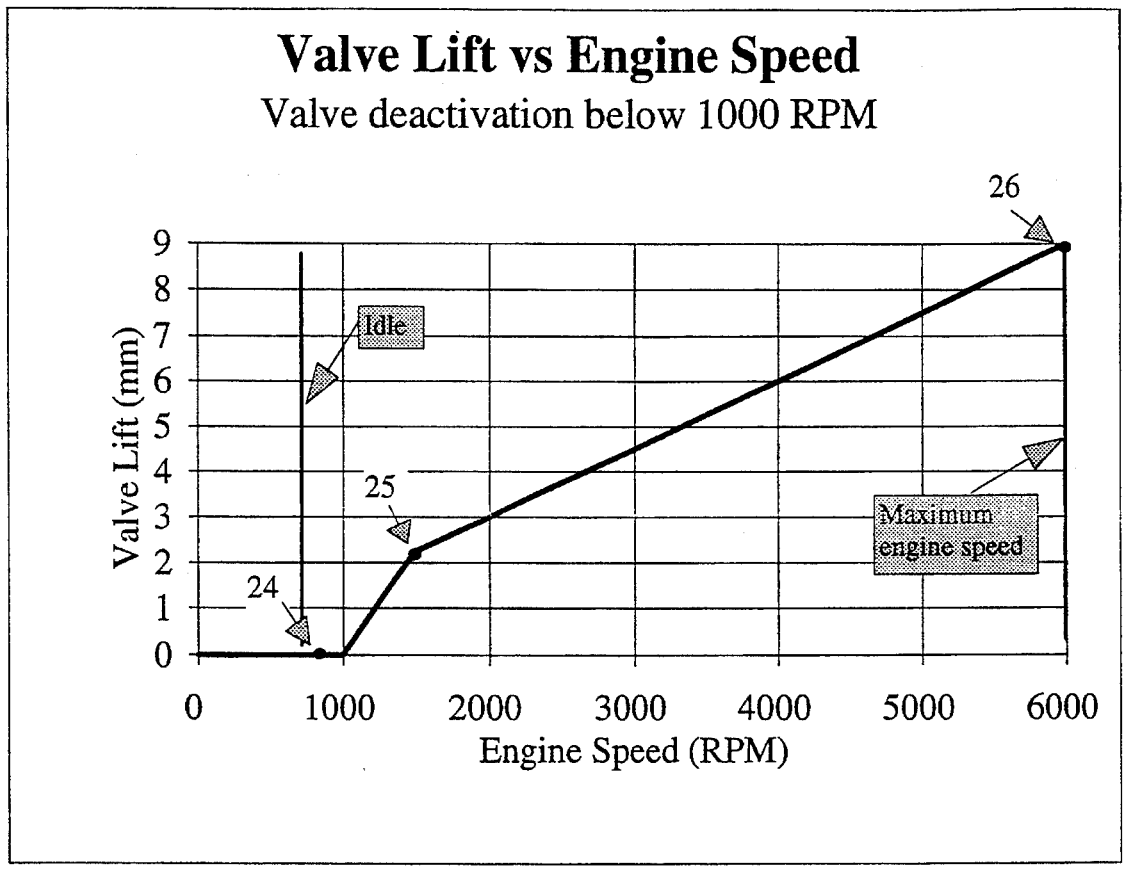
FIG. 6(b) shows the valve lifts for the timing schedule given in FIG. 6(a).
Figure 6C:
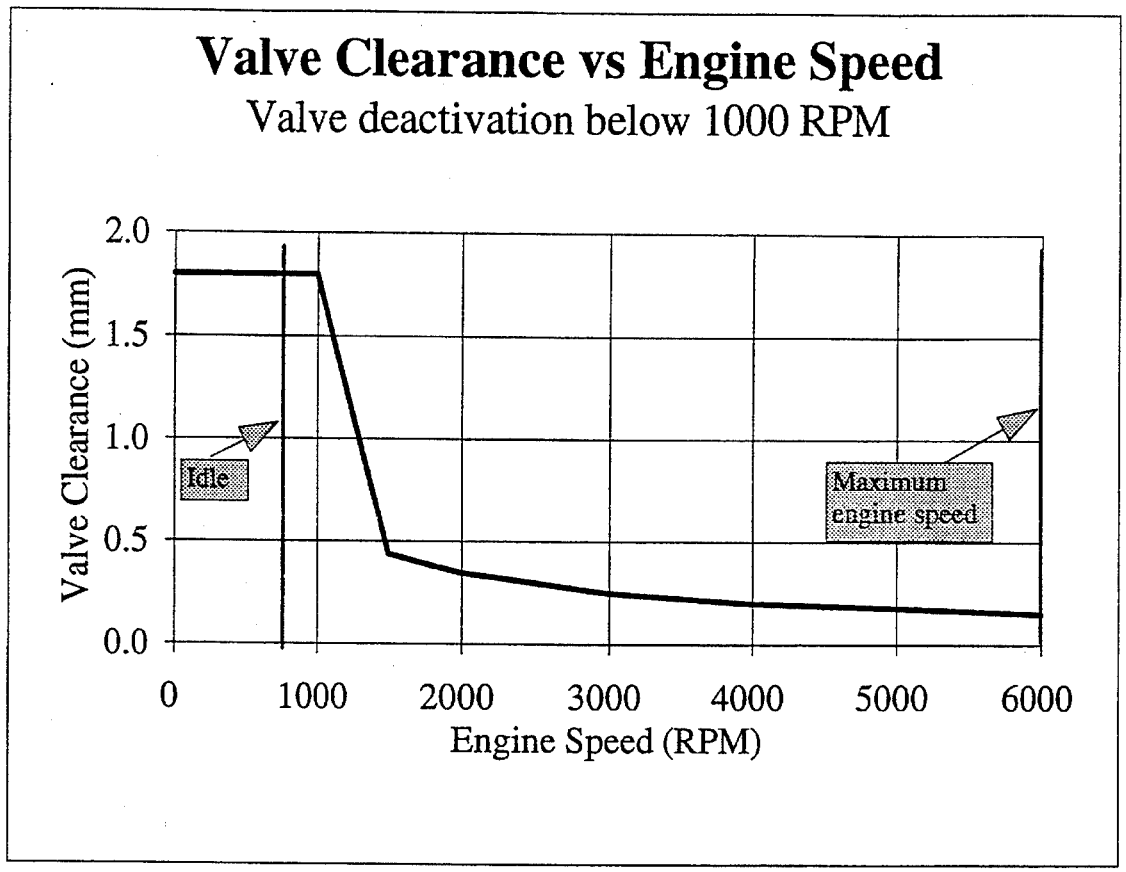
FIG. 6(c) shows the valve clearances for the timing schedule given in FIG. 6(a).

FIG. 6(*a*) shows one scenario of how valve timing might be achieved for valve deactivation at near idle conditions. In this case, below 1000 RPM the intake valve is deactivated. FIG. 6(b) shows valve lift for this alteration of intake valve timing with engine speed. The timing curves from 0 RPM to 1000 RPM do not appear in FIG. 6(a) during valve deactivation, and that shows in FIG. 6(b) as zero lift. To achieve zero valve lift, the amplification of the cam lift is reduced to 20% of maximum lift, and that requires a valve clearance of 1.8 mm. This is shown in FIG. 6(c). Between 1000 RPM and 1500 RPM, the valve clearance is reduced from 1.8 mm to 0.44 mm, while the amplification is increase from 20% of peak lift to 25% of peak lift. The choice of engine speeds at which deactivation may occur is only limited by choices of contact velocities and material stresses.

Figure 7A:
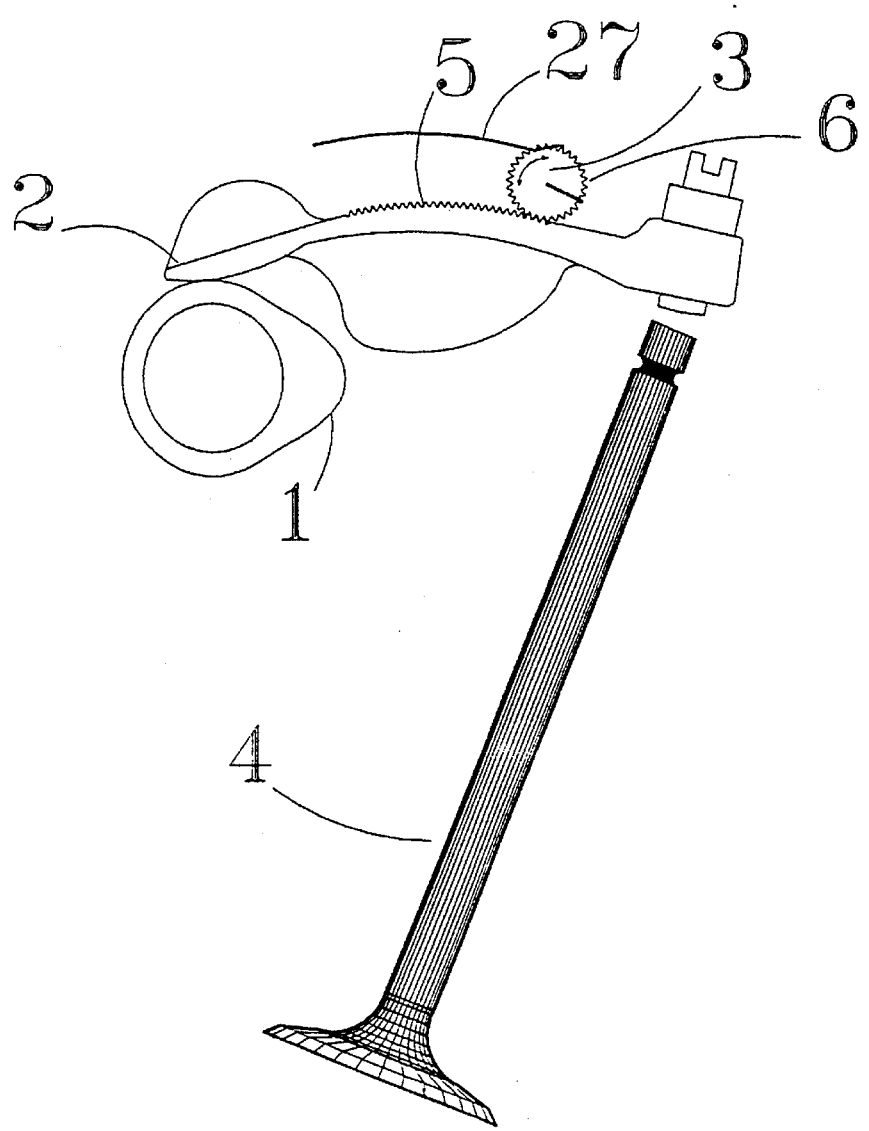
FIG. 7(a) shows the position of the pivot shaft for valve deactivation, with no cam lift.
Figure 7B:
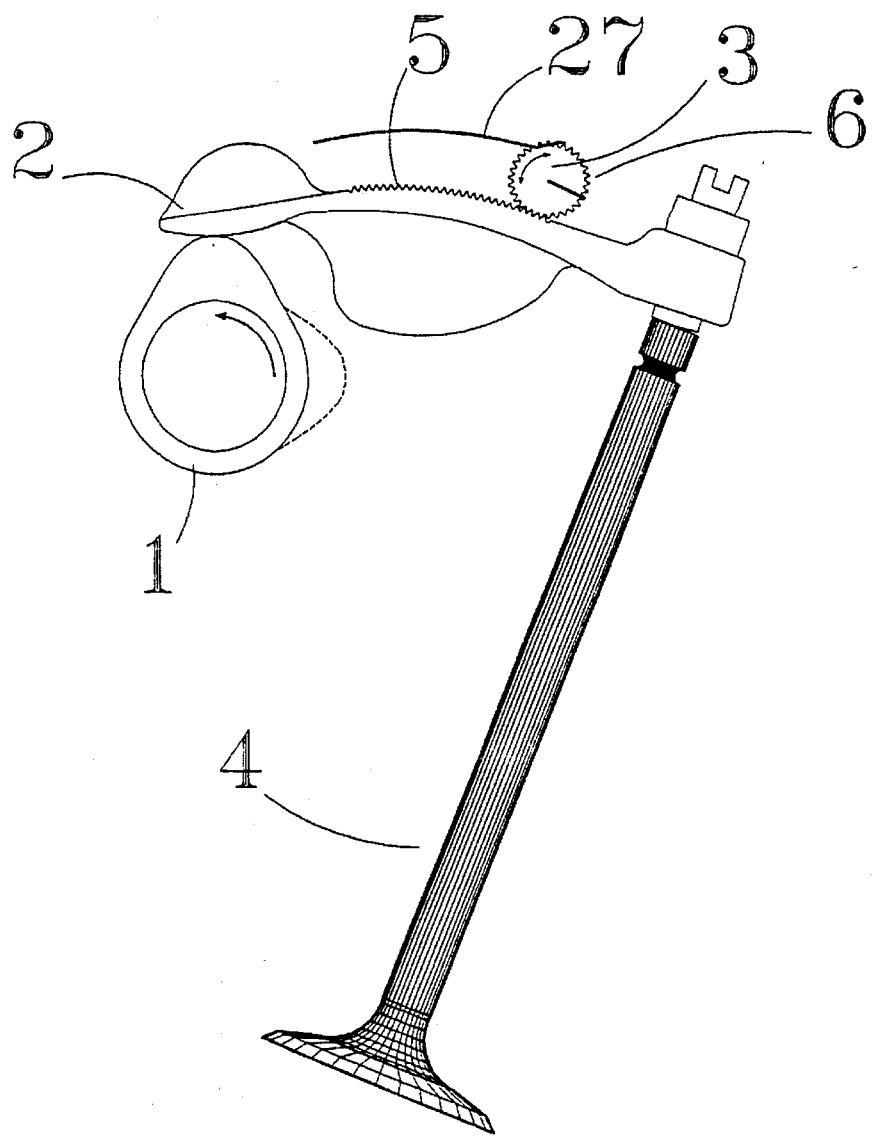
FIG. 7(b) shows the position of the pivot shaft for valve deactivation, with full cam lift.

FIG. 7(a) shows the valve clearance from point 24 in FIG. 6(b), for valve deactivation. FIG. 7(b) shows how full lift on the cam at point 24 will fail to open the valve.

Figure 7C:
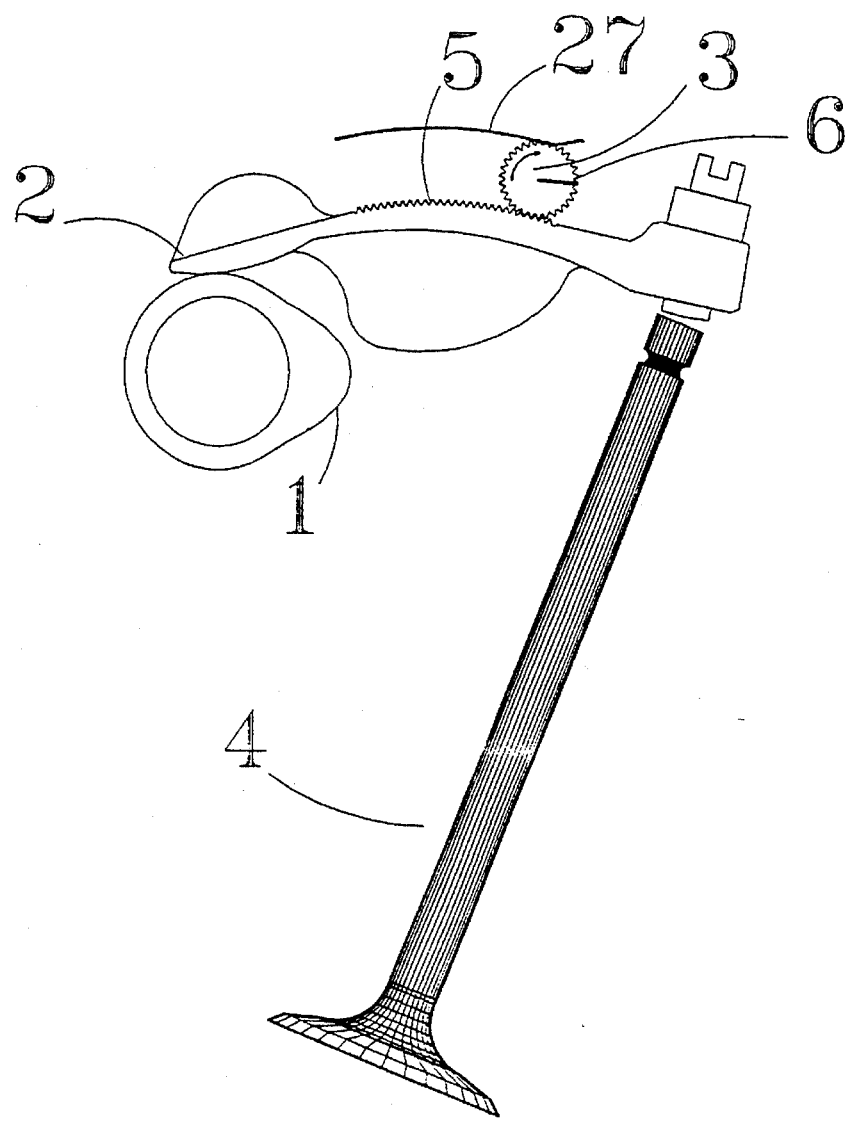
FIG. 7(c) shows the position of the pivot shaft for valve lift that is 25% of full lift, with no cam lift.
Figure 7D:
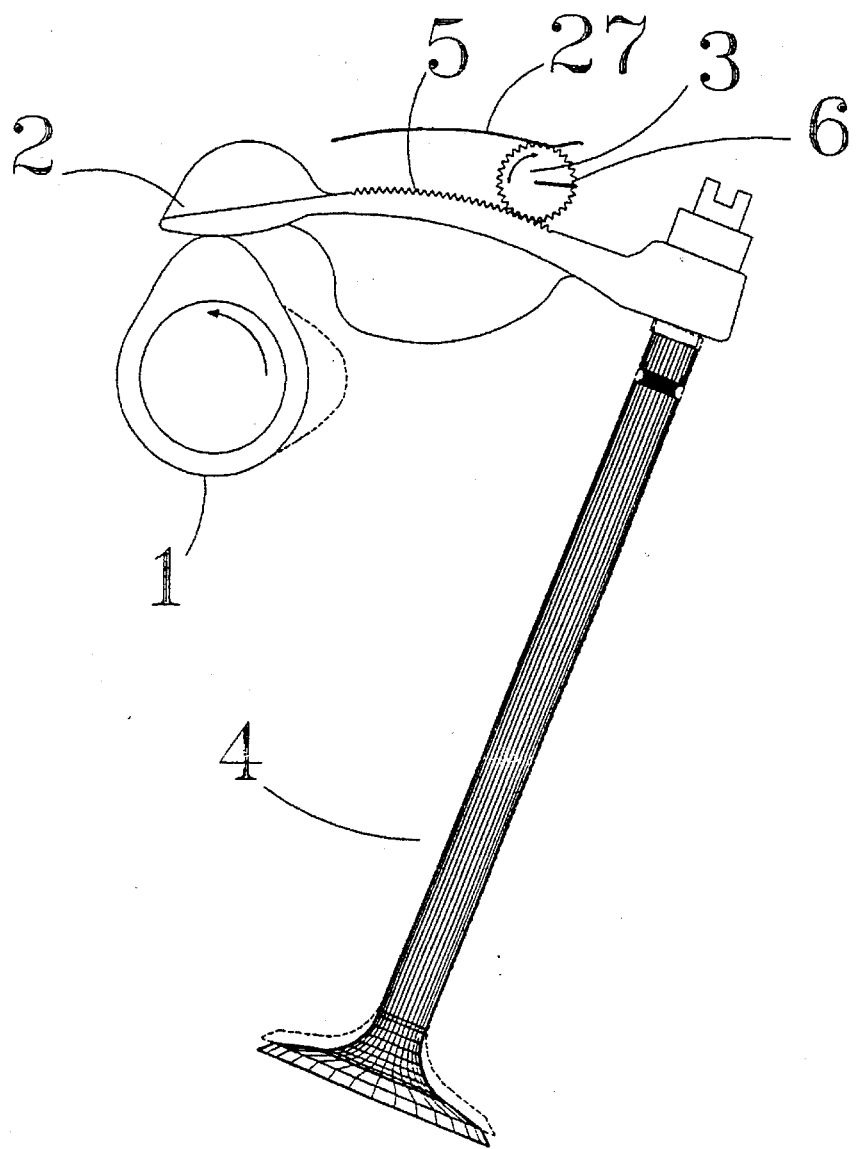
FIG. 7(d) shows the position of the pivot shaft for valve lift that is 25% of full lift, with full cam lift.

FIG. 7(c) shows the valve clearance from point 25 in FIG. 6(b), corresponding to 25% of full lift, and FIG. 7(d) shows the valve lift at full lift of the cam.

Figure 7E:
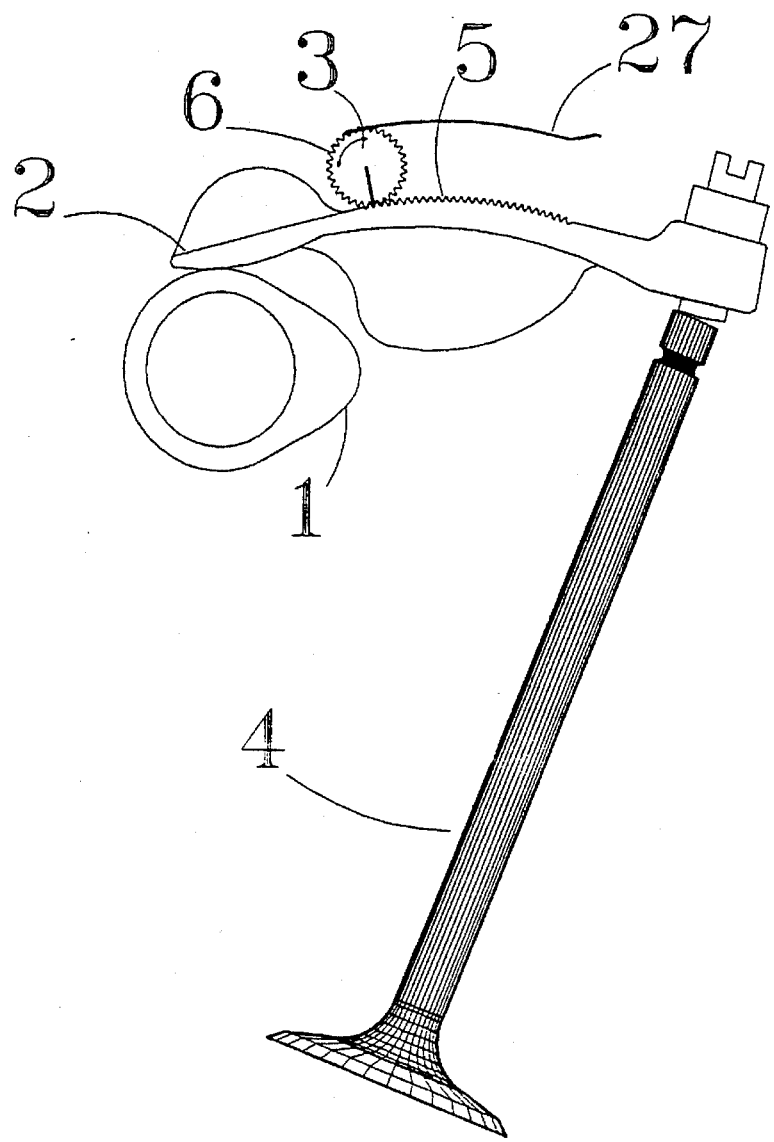
FIG. 7(e) shows the position of the pivot shaft for full valve lift, with no cam lift.
Figure 7F:
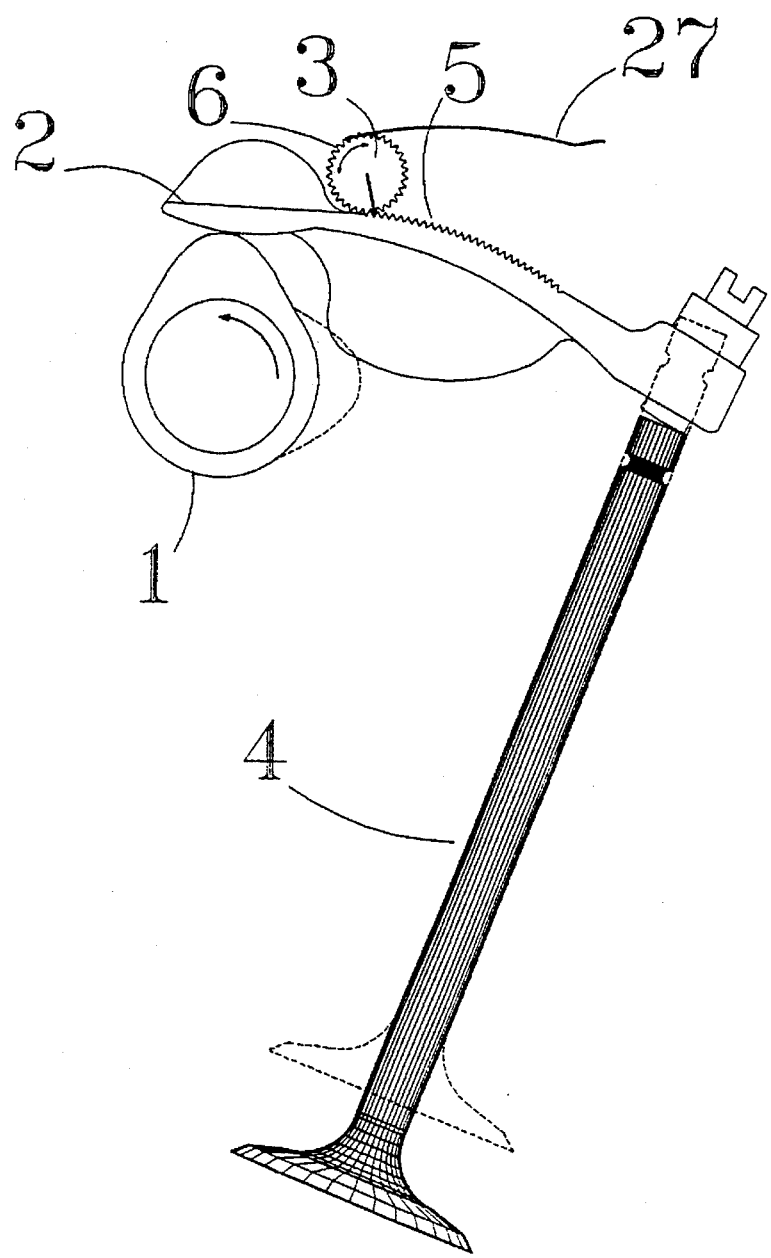
FIG. 7(f) shows the position of the pivot shaft for full valve lift, with full cam lift.

FIG. 7(e) shows the valve clearance from point 26 in FIG. 6(b), corresponding to full lift, and FIG. 7(f) shows the valve lift at this condition.

For engines with two or more intake valves, a strategy may be used whereby the two valves open at different lifts and timing to enhance gas mixing.

What is claimed is:

1. A method for operating and varying the extent of opening and timing of an internal combustion engine valve responsive to a cam on a camshaft, comprising: adjustably rolling a pivot shaft with a set of teeth on a rocker arm which rocks on the pivot shaft in order to vary the rocking of the rocker arm on the pivot shaft and thereby vary the extent of opening of the valve, the rocker arm having a body with a rack of teeth engaging said pivot shaft teeth, a cam follower in contact with said cam, and an actuator to actuate the valve, there being a valve clearance space between the valve actuator and the valve, wherein the pivot shaft position on the rocker arm body is adjustable to simultaneously vary the extent of opening of the valve caused by the actuator and the valve clearance; and opening and closing said valve by rocking the rocker arm on the pivot shaft.

2. The method of claim 1, wherein the pivot shaft includes a set of teeth to engage a stationary rack of teeth, and said step of rolling the pivot shaft includes rolling the pivot shaft along the stationary rack of teeth.

3. The method of claim 2, wherein the pivot shaft includes an annular untoothed portion and the rocker arm includes an untoothed portion, and the pivot shaft untoothed portion rolls on the rocker arm untoothed portion while the pivot shaft teeth are engaged with the rocker arm teeth.

4. The method of claim 3, wherein the pivot shaft includes an annular untoothed portion on each side of the pivot shaft teeth and the rocker arm includes an untoothed portion on each side of the rocker arm teeth, and the pivot shaft untoothed portions roll on the rocker arm untoothed portions while the pivot shaft teeth are engaged with the rocker arm teeth.

5. The method of claim 2, wherein the opening and closing of the valve are timed by the rocking of the rocker arm, and when the pivot shaft is rolled to a first position the timing of the valve opening is advanced, the extent of the valve opening is increased, and the timing of the valve closing is delayed, relative to when the pivot shaft is rolled to a second position different from the first position.

6. The method of claim 5, wherein the engine operates at an adjustable speed, and wherein said engine speed when said pivot shaft is at said first position is increased relative to when said pivot shaft is at said second position.

7. The method of claim 6, wherein the engine has an idle speed, and at said idle speed the pivot shaft is rolled to said second position.

8. The method of claim 6, wherein the engine starts up from a non-operating condition to an operating condition and during said start-up the pivot shaft is rolled to a start-up position at which the timing of the valve opening is advanced, the extent of the valve opening is increased, and the timing of the valve closing is delayed, relative to when the pivot shaft is rolled to said second position.

9. The method of claim 2, wherein the opening and closing of the valve are timed by the rocking of the rocker arm, and wherein the valve remains closed in response to said rocking of the rocking arm on the pivot shaft when the pivot shaft is rolled to a valve-closed position on the rocker arm.

10. The method of claim 9, wherein the rolling of the pivot shaft to the valve-closed position on the rocker arm increases the valve clearance.

11. The method of claim 2, wherein the rolling of the pivot shaft on the rocker arm describes a first path, and the rocker arm rack of teeth describe a second path.

12. The method of claim 11, wherein said first path and second path are non-concentric arcs of circles.

13. The method of claim 11, wherein at least one of said first path and second path is not an arc of a circle.

14. The method of claim 2, wherein the positioning of the pivot shaft on the rocker arm of a full-lift position results in a maximum lift of the valve and determines the maximum velocity of the valve actuator contacting the valve.

15. An apparatus for varying the extent of opening of an internal combustion engine valve responsive to a cam on a camshaft from no opening to a maximum opening, comprising: a rocker arm having a body and a rack of teeth, a cam follower in contact with said cam, and an actuator to open said valve, there being a valve clearance space between the actuator and the valve; and a pivot shaft having a set of rocker arm-engaging teeth mating with the rocker arm body rack of teeth whereby the rocker arm rocks on said pivot shaft to actuate the valve as the cam follower is moved by the cam, the position of the pivot shaft and the valve clearance both being adjustable by movement of the pivot shaft along the rocker arm body rack of teeth.

16. The apparatus of claim 15, wherein the rocker arm body rack of teeth is an arc of a circle, and the path of the pivot shaft as it moves along the rocker arm body rack of teeth is an arc of a circle that is not concentric with the arc of the circle of the rocker arm body rack of teeth.

17. The apparatus of claim 16, wherein at least one of the rocker arm body rack of teeth and the path of the pivot shaft along the rocker arm body rack of teeth is not an arc of a circle.

18. The apparatus of claim 15, wherein the amount of valve clearance at no valve opening is at least as much as an amount of movement produced in the valve actuator by the rocking of the rocker arm on the pivot shaft.

* * * * *